(12) United States Patent
Lethiecq et al.

(10) Patent No.: US 10,795,396 B2
(45) Date of Patent: Oct. 6, 2020

(54) ELECTRONIC DEVICE PROVIDING A TEMPERATURE SENSOR OR A CURRENT SOURCE DELIVERING A TEMPERATURE INDEPENDENT CURRENT

(71) Applicant: STMicroelectronics SA, Montrouge (FR)

(72) Inventors: Renan Lethiecq, Bernin (FR); Philippe Galy, Le Touvet (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 16/572,130

(22) Filed: Sep. 16, 2019

(65) Prior Publication Data

US 2020/0097036 A1   Mar. 26, 2020

(30) Foreign Application Priority Data

Sep. 24, 2018   (FR) ...................................... 18 58656

(51) Int. Cl.
*G01K 7/25*   (2006.01)
*G05F 3/24*   (2006.01)

(52) U.S. Cl.
CPC ............... *G05F 3/245* (2013.01); *G01K 7/25* (2013.01)

(58) Field of Classification Search
CPC .................................. G01K 7/25; G05F 3/245
USPC .................................................. 327/512, 543
See application file for complete search history.

(56) References Cited

U.S. PATENT DOCUMENTS

| | | | |
|---|---|---|---|
| 5,279,162 A | 1/1994 | Takebe et al. | |
| 6,687,175 B1 | 2/2004 | Mizuno et al. | |
| 7,436,722 B2 | 10/2008 | Mizuno et al. | |
| 9,004,756 B2 * | 4/2015 | John | G01K 7/01 374/163 |
| 9,293,215 B2 | 3/2016 | Yoo et al. | |
| 2008/0218253 A1 | 9/2008 | Pietri et al. | |
| 2008/0272828 A1 | 11/2008 | Min | |
| 2009/0285261 A1 | 11/2009 | Casey et al. | |
| 2012/0181430 A1 * | 7/2012 | Noguchi | G01J 5/24 250/338.4 |

FOREIGN PATENT DOCUMENTS

| | | |
|---|---|---|
| JP | S56105682 A | 8/1981 |
| WO | 2005078729 A2 | 8/2005 |
| WO | 2017201353 A1 | 11/2017 |

OTHER PUBLICATIONS

INPI Search Report and Written Opinion for FR 1858656 dated May 31, 2019 (9 pages).

* cited by examiner

*Primary Examiner* — William Hernandez
(74) *Attorney, Agent, or Firm* — Crowe & Dunlevy

(57) ABSTRACT

An electronic device includes a module that delivers a positive temperature coefficient output voltage at an output terminal. A thermistor includes a first MOS transistor operating in weak inversion mode and having a negative temperature coefficient drain-source resistance and whose source is coupled to the output terminal. A current source coupled to the output terminal operates to impose the drain-source current of the first transistor.

27 Claims, 3 Drawing Sheets

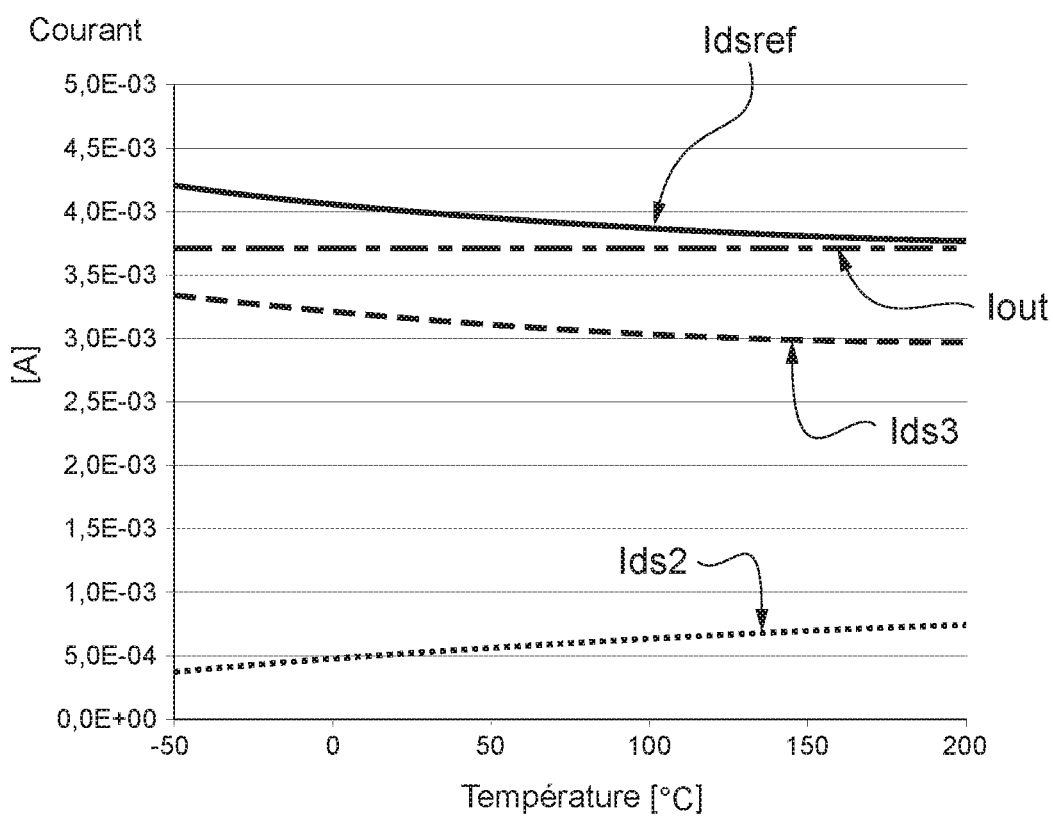

ELECTRONIC DEVICE PROVIDING A TEMPERATURE SENSOR OR A CURRENT SOURCE DELIVERING A TEMPERATURE INDEPENDENT CURRENT

PRIORITY CLAIM

This application claims the priority benefit of French Application for Patent No. 1858656, filed on Sep. 24, 2018, the content of which is hereby incorporated by reference in its entirety to the maximum extent allowable by law.

TECHNICAL FIELD

Embodiments relate to electronic devices, and more particularly to electronic devices designed to maintain stable performance in an environment having a significant temperature variation.

BACKGROUND

Generally speaking, to minimize the influence of the temperature variation, the electronic device includes either: a particular structure, such as a housing (or package) designed to evacuate heat when the temperature increases; or a thermal sensor configured to detect the temperature and a control module configured to control thermoelectric activities of said electronic device on the basis of the detected temperature, so as to increase or reduce the heat generated by the electronic device; or a current source module configured to generate positive temperature coefficient (PTC) and/or negative temperature coefficient (NTC) currents so as to generate a current that is insensitive to the ambient temperature; or a bias circuit configured to precisely bias certain transistors of said electronic device around a zero temperature coefficient (ZTC) point known to those skilled in the art, so as to make these transistors insensitive to the ambient temperature.

However, these conventional solutions generally require an obtrusive structure that includes a plurality of additional complex modules in order to compensate the influence of the temperature variation or to sufficiently bias said certain transistors via their back gate when these are produced on a silicon-on-insulator substrate, thereby consequently leading to a high development time, a high manufacturing cost and/or a large silicon footprint.

There is thus a need for a low-complexity, low-cost and low-silicon-surface technical solution that makes it possible to detect the temperature variation in the environment of an electronic device and to compensate this variation in such a way as to keep the performance of said electronic device stable regardless of the temperature.

SUMMARY

According to one aspect, an electronic device is proposed. This electronic device includes a circuit module having an output terminal, configured to deliver, on said output terminal, a positive temperature coefficient output voltage.

This circuit module includes: a thermistor having a first MOS transistor configured to operate in weak inversion mode and have a negative temperature coefficient drain-source resistance and whose source is coupled to said output terminal, and a current source coupled to the output terminal and configured to impose the drain-source current of the first transistor.

Such an electronic device advantageously makes it possible to detect the ambient temperature by using a thermistor having a first MOS transistor in weak inversion mode and a current source coupled to the thermistor.

When the first MOS transistor operates in weak inversion mode, commonly also known to those skilled in the art under the concept sub-threshold mode, with the gate voltage of the first transistor lower than the threshold voltage of the first transistor, and is biased with a fixed drain-source voltage, the drain-source current has a positive temperature coefficient. As a result, the drain-source resistance of the first MOS transistor has a negative temperature coefficient.

In other words, the drain-source resistance of the first transistor decreases as the temperature increases.

When only the drain voltage of the first transistor is fixed and said drain-source current is imposed by said current source, the drain-source voltage of the first transistor, which is equal to the product of the drain-source current and the drain-source resistance, decreases as the temperature increases.

As a result, the source voltage of the first transistor, in order words the voltage at the output terminal, increases as the temperature increases, and therefore has a positive temperature coefficient.

Advantageously, such a module, which is temperature-sensitive, has a compact structure with just a thermistor and an associated current source.

Furthermore, as the thermistor operates in weak inversion mode, the drain-source current of the first transistor is very low, and the consumption of said module is therefore advantageously low.

According to one embodiment, the current source includes a second MOS transistor whose gate is coupled to the output terminal, the second MOS transistor being configured to operate in strong inversion mode and have a gate leakage current intended to impose the drain-source current of the first MOS transistor.

The first and second MOS transistors may, for example, be NMOS transistors.

According to another embodiment, the second transistor is configured to have a gate leakage current of the same order of magnitude as the drain-source current of the first transistor.

The use of the gate leakage current of the second transistor imposing the drain-source current of the first transistor advantageously allows for low consumption of the module.

The source voltage of the first transistor, in other words the voltage at the output terminal, imposes the gate voltage of the second transistor.

By way of non-limiting indication, the thickness of the gate oxide of the second MOS transistor may for example be less than 2 nm.

The voltage at the output terminal may be substantially proportional to the temperature.

The module may, for example, form a temperature sensor for detecting the temperature.

According to one variant embodiment, the electronic device comprises a circuit including: the module outlined above, which is advantageously temperature-sensitive, and a third negative temperature coefficient MOS transistor whose gate is coupled to the drain of the first MOS transistor of said module, whose source is coupled to the source of the second MOS transistor of said module, and whose drain is coupled to the drain of this second MOS transistor.

The sources of the second and third transistors then form an output of the circuit.

The circuit is advantageously configured to deliver, on its output, a substantially temperature-independent output current.

As indicated above, the gate voltage of the second transistor is determined by the source voltage of the first positive temperature coefficient transistor.

Thus, such a circuit advantageously requires only one power source to bias both the second and third transistors.

The drain-source currents generated by the second and third transistors have a positive temperature coefficient and a negative temperature coefficient, respectively. The combination of these drain-source currents advantageously forms a temperature-insensitive output current.

According to one embodiment, the third MOS transistor is an NMOS transistor.

This circuit may advantageously form a temperature-independent current source configured to deliver, on its output, a substantially temperature-independent output current.

By way of non-limiting example, the electronic device may be produced in an integrated manner.

The electronic device may, for example, be produced on a silicon-on-insulator substrate.

When said substrate is a silicon-on-insulator substrate, each of the first, second and third transistors has a back gate, and the back gates of the first, second and third MOS transistors are advantageously coupled together.

Such an electronic device advantageously makes it possible to produce a temperature-insensitive current source without it being necessary to use the back gates of the transistors of the current source to control the operation of these transistors.

Said silicon-on-insulator substrate may, for example, be a fully or partly depleted silicon-on-insulator substrate.

According to another aspect, what is proposed is an electronic appliance, such as a cellular mobile telephone, tablet or laptop computer, comprising an electronic device such as defined above.

BRIEF DESCRIPTION OF THE DRAWINGS

Other advantages and features of the invention will become apparent upon examining the detailed description of completely non-limiting embodiments and the appended drawings, in which:

FIG. 5 illustrates a SPICE simulation of the temperature insensitive current source circuit of FIG. 4.

DETAILED DESCRIPTION

Figure 1:
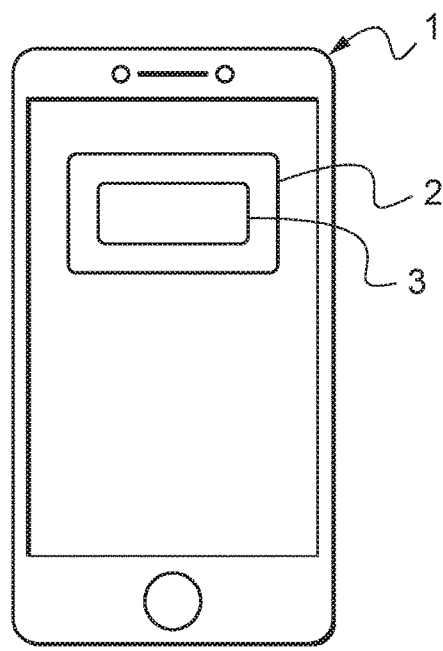
FIG. 1 illustrates an electronic appliance with a temperature sensing circuit module.

Reference 1 in FIG. 1 denotes an electronic appliance, in this case for example a cellular mobile telephone designed to withstand extreme environmental conditions, such as a significant temperature variation.

The electronic appliance 1 includes an electronic device 2 intended to be used to minimize the influence of the ambient temperature variation.

The electronic device 2 in this case includes a circuit module 3 operating as a temperature sensor and produced in an integrated manner, preferably on a fully depleted silicon-on-insulator substrate, commonly known to those skilled in the art under the acronym FDSOI.

It should be noted that the electronic device 2 may also be produced on a partly depleted silicon-on-insulator substrate, commonly known to those skilled in the art under the acronym PDSOI, whose silicon film covering the buried insulating layer (BOX: "buried oxide") preferably has a thickness that is not too great so as to avoid memory effects, for example a thickness close to that of the semiconductor film of a fully depleted silicon-on-insulator (FDSOI) substrate.

Figure 2:
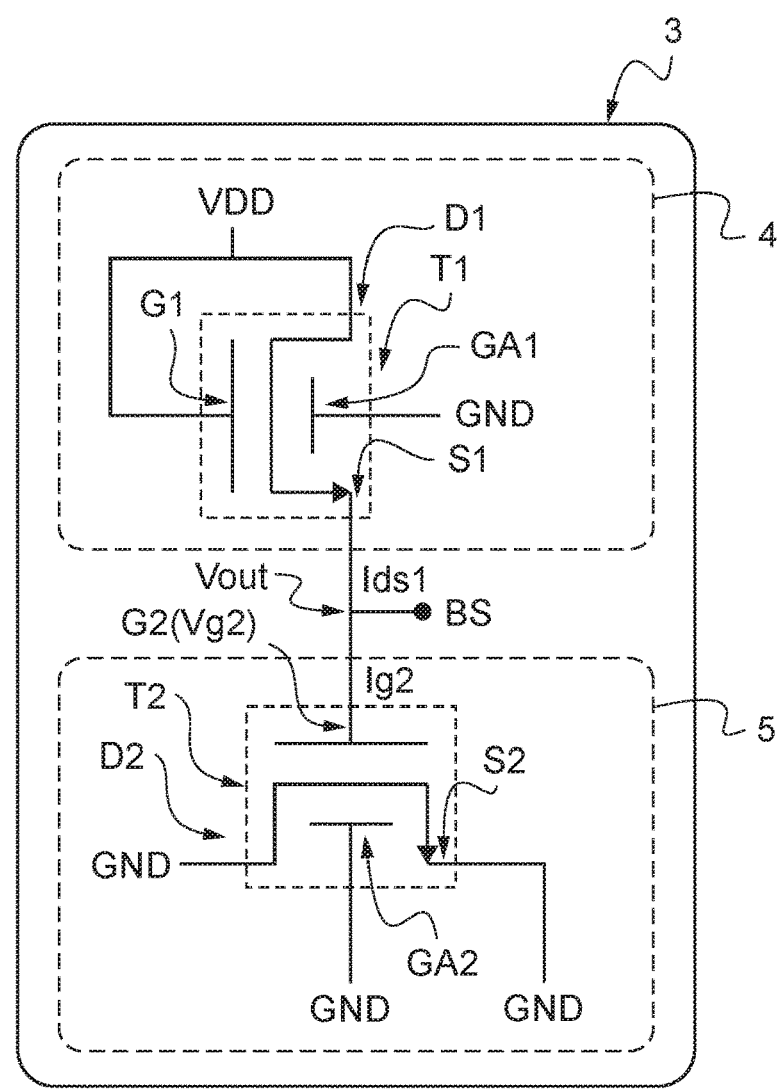
FIG. 2 is a circuit diagram for an embodiment of the temperature sensing circuit module.

Reference is now made to FIG. 2 in order to illustrate in more detail one exemplary embodiment of the circuit module 3, which includes: a thermistor 4 including a first MOS transistor T1, in this case for example an NMOS transistor, whose source S1 is coupled to an output terminal BS of the circuit module, and whose drain D1 and gate G1 are jointly coupled to a supply voltage VDD, and a current source 5 including a second MOS transistor T2, in this case for example an NMOS transistor, whose gate G2 is coupled to the output terminal BS, and whose drain D2 and source S2 are jointly coupled to ground GND.

Said supply voltage VDD may, for example, be 1 V, so that the first transistor T1 is in weak inversion mode, that is to say having a gate-source voltage lower than its threshold voltage.

In this case, the output voltage Vout at the output terminal BS, in other words the gate voltage Vg2 of the second transistor T2, is variable between 0.6 V and 0.95 V, thereby allowing operation of the second transistor T2 in strong inversion mode, that is to say having a gate-source voltage higher than its threshold voltage.

It should be noted that the drain D2 of the second transistor T2 may also be coupled to a supply voltage, for example of 1 V, at the expense of an increase in the power consumption of the second transistor T2.

As the second transistor T2 operates in strong inversion mode, there is a gate leakage current Ig2 of the second transistor T2 that imposes the drain-source current Ids1 of the first transistor T1. The orders of magnitude of the gate leakage current Ig2 and of the drain-source current Ids1 of the first transistor T1 are substantially equal. By way of indication, these leakage currents are of the order of about one hundred picoamperes.

To this end, the thickness of the gate oxide of the second transistor T2 is preferably less than 2 nm.

It should be noted that the back gates GA1, GA2 of the first and second transistors T1 and T2 are coupled to ground GND and are not used to control the first and second transistors T1 and T2.

Figure 3:
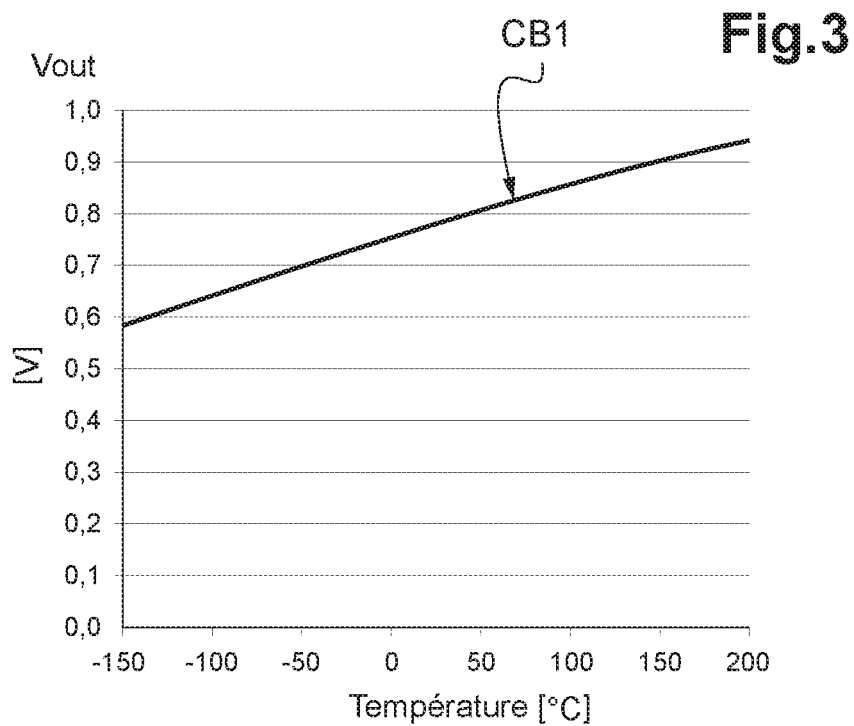
FIG. 3 illustrates a SPICE simulation of the temperature sensing circuit module of FIG. 2.

FIG. 3 illustrates a SPICE ("Simulation Program with Integrated Circuit Emphasis") simulation of the module 3 as a function of the temperature, within a range between −150° C. and 200° C.

As is seen from the curve CB1 of FIG. 3, the output voltage Vout varies proportionally to the temperature. The output voltage Vout varies substantially linearly between 0.6 V and 0.95 V.

Due to this, said module 3 forms a temperature sensor that makes it possible to detect the temperature on the basis of the measured output voltage Vout.

The electronic device 2 may further or alternatively include a circuit module 10 operating as a temperature insensitive circuit and produced in an integrated manner, preferably on an FDSOI substrate. The electronic device 2 may be used for other purposes than a cellular mobile telephone.

In this variant embodiment, the circuit module 10, that will be seen hereinafter to be temperature-insensitive, is capable of delivering, on its output, a substantially temperature-independent current.

Figure 4:
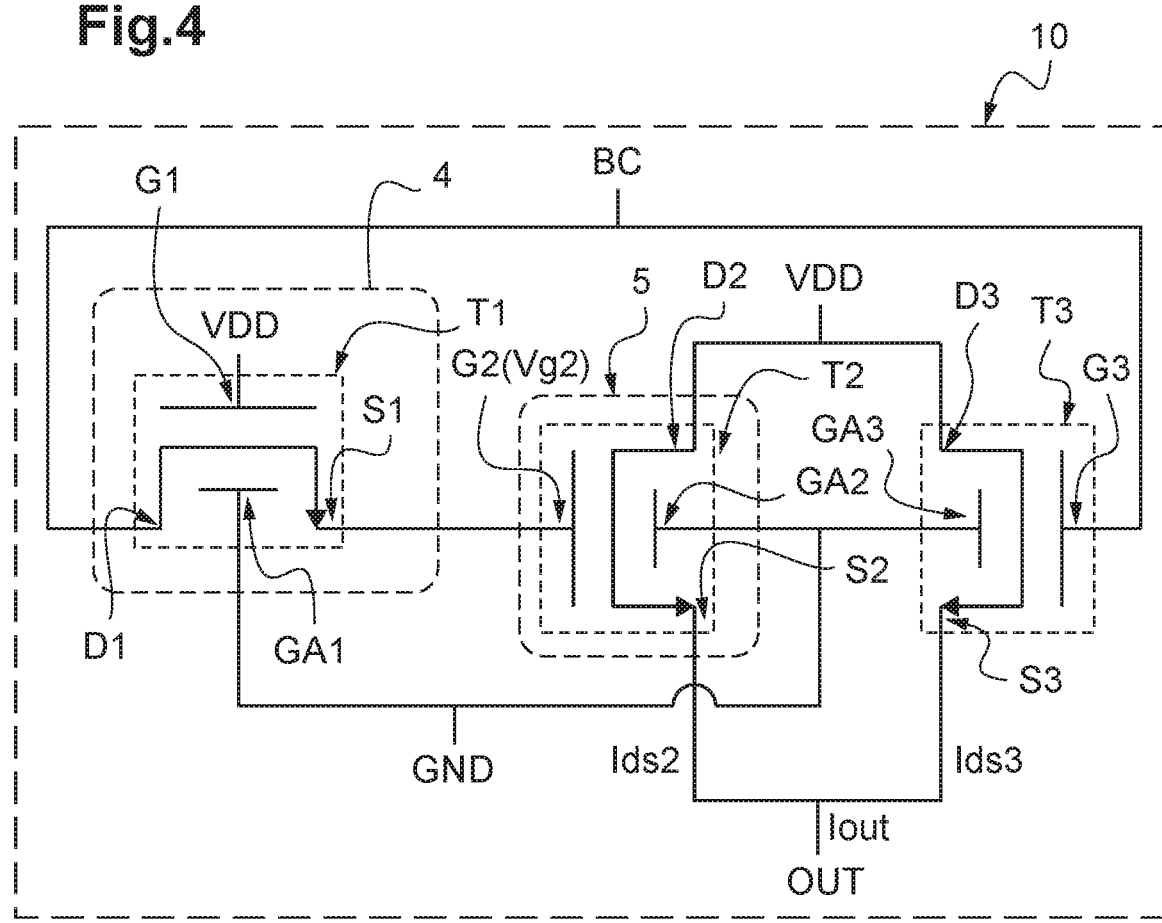
FIG. 4 is a circuit diagram for an embodiment of a temperature insensitive current source circuit.

The electronic device 2 illustrated here in FIG. 4 is produced, for example, in the same way in terms of technology as that illustrated in FIG. 2.

Said circuit 10 includes: the circuit module 3 as illustrated in FIG. 2, and a third MOS transistor T3, in this case for example also an NMOS transistor, whose gate G3 is coupled to the drain D1 of the first transistor T1, whose source S3 is coupled to the source S2 of the second transistor T2, and whose drain D3 is coupled to the drain D2 of the second transistor T2.

The sources S2, S3 of the second and third transistors T2, T3 form an output OUT delivering an output current Tout.

This output OUT could possibly be coupled to ground GND by way or not by way of a load.

The drains D2, D3 of the second and third transistors T2, T3 are jointly coupled to a supply voltage VDD, for example of 1 V.

The gate G1 of the first transistor T1 of the module 3 is also coupled to the supply voltage VDD.

The third transistor T3 is a conventional negative temperature coefficient transistor.

The gate G3 of the third transistor T3 and the drain D1 of the first transistor T1 are coupled and form a control terminal BC.

When the control terminal BC is coupled to a supply voltage, for example the supply voltage VDD, the third transistor T3 operates in strong inversion mode, in other words its gate-source voltage is greater than its threshold voltage.

When the third transistor T3 operates in strong inversion mode, the drain-source current Ids3 of the third transistor T3 varies in a manner inversely proportional to the ambient temperature.

At the same time, the gate voltage Vg2 of the second transistor T2 varies proportionally to the ambient temperature, as illustrated in FIG. 3.

As a result, the drain-source current Ids2 of the second transistor T2, being controlled by the gate voltage Vg2, varies proportionally to the ambient temperature. In other words, the second transistor T2 operating in strong inversion mode has a positive temperature coefficient.

By appropriately choosing the dimensions of the second and third transistors T2, T3 in such a way as to adjust the values of the currents Ids2 and Ids3, the output current Tout, which is the sum of these two currents, is able to be temperature-independent.

In other words, in this case, the output current Tout remains stable regardless of the ambient temperature.

It should be noted that said circuit 10 advantageously requires only one control voltage at the control terminal BC so as to control the operation of the current source, this being different from a conventional solution that generally requires two precise control voltages to be applied to the gates G2, G3 of the second and third transistors T2, T3, respectively.

In this exemplary embodiment, the back gates GA1, GA2, GA3 of the first, second and third transistors T1, T2, T3 are jointly coupled to ground GND and are not used to control the operation of the current source, this also being different from a conventional solution that requires control operations for the back gates of the transistors.

That being said, as a variant, the back gates GA1, GA2, GA3 of the first, second and third transistors T1, T2, T3 could be individually biased in order for example to allow additional channel control operations for these transistors.

In addition, the thermistor 4 may include an additional transistor, for example diode-connected and coupled between the source S1 of the first transistor T1 and the gate G2 of the second transistor T2, so as to increase the equivalent resistance of the thermistor 4.

Reference is now made to FIG. 5 in order to illustrate a SPICE simulation of a circuit 10 when the control terminal BC of said circuit 10 is coupled to a supply voltage VDD of 1 V.

By way of non-limiting example, the length of the channel of the first transistor T1 is 500 nm and the lengths of the channels of the second and third transistors are equal to 30 nm. The widths of the channels of the first, second and third transistors T1, T2, T3 are 500 nm, 1 µm, 3.75 µm, respectively.

FIG. 5 also illustrates a SPICE simulation using a reference transistor that is equivalent to the combination of the second and third transistors T2, T3. The length of the channel of the reference transistor is identical to those of the second and third transistors T2, T3, and the width of the channel of the reference transistor is equal to the sum of those of the second and third transistors T2, T3, i.e. 4.75 µm.

Specifically, a person skilled in the art knows to use such a conventional negative temperature coefficient reference transistor in order to compare its drain-source current with the output current of an equivalent temperature-insensitive current source. A large offset between its drain-source currents may generally be observed with temperature-insensitive current sources from the prior art.

FIG. 5 shows that the variation in the drain-source current Ids2 of the second transistor T2 is proportional to the temperature variation. The variations in the drain-source currents Ids3 and Idsref of the third transistor T3 and of the reference transistor are inversely proportional to the temperature variation.

The output current Tout, which is the sum of the currents Ids2 and Ids3, is substantially constant regardless of the temperature.

Advantageously in comparison with the case of a conventional temperature-insensitive current source, there is very little offset between the output current Tout and the drain-source current Idsref of the reference transistor.

Due to this, degradation in terms of the output current in comparison with the reference transistor is reduced, and the performance of the circuit 10 forming a temperature-independent current source is advantageously greater than that of a conventional temperature-insensitive current source.

What is thus obtained is an electronic device that makes it possible to detect the temperature and to deliver a temperature-independent current with a single control supply voltage, while at the same time using a circuit that is unobtrusive, not complex, has lower power consumption and exhibits better performance.

The invention claimed is:
1. An electronic device, comprising:
  a circuit module having a first output terminal that is configured to deliver a positive temperature coefficient output voltage;
  wherein the circuit module comprises:
    a thermistor having a first MOS transistor configured to operate in weak inversion mode and have a negative temperature coefficient drain-source resistance and whose source is coupled to said first output terminal, and a current source having a control terminal coupled to the first output terminal and configured to impose a drain-source current of the first MOS transistor.

2. The device according to claim 1, wherein the current source comprises a second MOS transistor having a gate that is coupled to the first output terminal, the second MOS transistor being configured to operate in strong inversion mode and have a gate leakage current configured to impose the drain-source current of the first MOS transistor.

3. The device according to claim 2, wherein the first and second MOS transistors are NMOS transistors.

4. The device according to claim 2, wherein the gate leakage current of the second MOS transistor has a same order of magnitude as the drain-source current of the first MOS transistor.

5. The device according to claim 4, wherein a thickness of a gate oxide of the second MOS transistor is less than 2 nm.

6. The device according to claim 2, further comprising:
a negative temperature coefficient MOS transistor having a gate that is coupled to a drain of the first MOS transistor, a source that is coupled to a source of the second MOS transistor of the circuit module, and a drain that is coupled to a drain of the second MOS transistor,
wherein the sources of the second MOS transistor and the negative temperature coefficient MOS transistor form a second output.

7. The device according to claim 6, wherein the negative temperature coefficient MOS transistor is an NMOS transistor.

8. The device according to claim 6, wherein said second output generates a substantially temperature-independent output current.

9. The device according to claim 6, produced on a silicon-on-insulator substrate, wherein each of the first MOS transistor, the second MOS transistor and the negative temperature coefficient MOS transistor has a back gate, and the back gates are coupled together to receive a common voltage.

10. The device according to claim 9, wherein the silicon-on-insulator substrate is a fully or partly depleted silicon-on-insulator substrate.

11. The device according to claim 6, wherein the device is a component of an electronic appliance selected from the group consisting of a cellular mobile telephone, a tablet and a laptop computer.

12. The device according to claim 1, wherein said circuit module forms a temperature sensor with an output voltage at said first output terminal varying proportionally to temperature.

13. The device according to claim 1, produced in an integrated manner.

14. The device according to claim 13, produced on a silicon-on-insulator substrate.

15. The device according to claim 14, wherein the silicon-on-insulator substrate is a fully or partly depleted silicon-on-insulator substrate.

16. The device according to claim 1, produced on a silicon-on-insulator substrate, wherein each of the first MOS transistor and the second MOS transistor has a back gate, and the back gates are coupled together to receive a common voltage.

17. The device according to claim 1, wherein the device is a component of an electronic appliance selected from the group consisting of a cellular mobile telephone, a tablet and a laptop computer.

18. An electronic device, comprising:
a first MOS transistor configured as a thermistor and having a source coupled to a first output terminal, a drain coupled to a supply voltage node and a gate coupled to the drain such that the first MOS transistor operates in a weak inversion mode with a negative temperature coefficient drain-source resistance; and
a second MOS transistor configured as a current source and having a gate coupled to the first output terminal to impose a drain-source current of the first MOS transistor, a drain and a source.

19. The device according to claim 18, wherein the second MOS transistor operates in strong inversion mode and has a gate leakage current which imposes the drain-source current of the first MOS transistor.

20. The device according to claim 18, wherein the first and second MOS transistors are NMOS transistors.

21. The device according to claim 18, wherein an output voltage at said first output terminal varies proportionally to temperature.

22. The device according to claim 18, produced on a silicon-on-insulator substrate, wherein each of the first MOS transistor and the second MOS transistor has a back gate, and the back gates are coupled together to receive a common voltage.

23. An electronic device, comprising:
a first MOS transistor configured as a thermistor and having a source coupled to a first node, a drain coupled to a control node and a gate coupled to a supply voltage node;
a second MOS transistor configured as a current source and having a gate coupled to the first node to impose a drain-source current of the first MOS transistor, a drain coupled to the supply voltage node and a source coupled to an output node; and
a third MOS transistor having a gate coupled to the control node, a drain coupled to the supply voltage node and a source coupled to the output node.

24. The device according to claim 23, wherein the first, second and third MOS transistors are NMOS transistors.

25. The device according to claim 23, wherein the output node generates a current which is substantially temperature-independent.

26. The device according to claim 23, produced on a silicon-on-insulator substrate, wherein each of the first MOS transistor, the second MOS transistor and the third MOS transistor has a back gate, and the back gates are coupled together to receive a common voltage.

27. The device according to claim 26, wherein the silicon-on-insulator substrate is a fully or partly depleted silicon-on-insulator substrate.

* * * * *

UNITED STATES PATENT AND TRADEMARK OFFICE
CERTIFICATE OF CORRECTION

PATENT NO. : 10,795,396 B2
APPLICATION NO. : 16/572130
DATED : October 6, 2020
INVENTOR(S) : Renan Lethiecq et al.

Page 1 of 1

It is certified that error appears in the above-identified patent and that said Letters Patent is hereby corrected as shown below:

In the Specification

Column 5, Line 19, replace the term [[ Tout ]] with -- Iout --.

Column 5, Line 51, replace the term [[ Tout ]] with -- Iout --.

Column 5, Line 54, replace the term [[ Tout ]] with -- Iout --.

Column 6, Line 41, replace the term [[ Tout ]] with -- Iout --.

Column 6, Line 46, replace the term [[ Tout ]] with -- Iout --.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*